Dec. 12, 1933.   J. O. DIXON   1,939,490
COMPOUND TOOL
Filed June 30, 1930   2 Sheets-Sheet 2
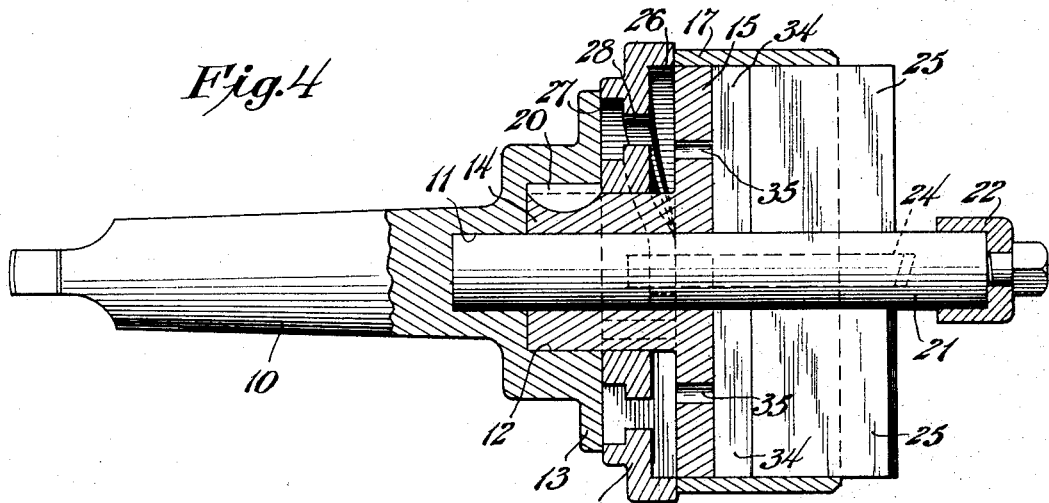
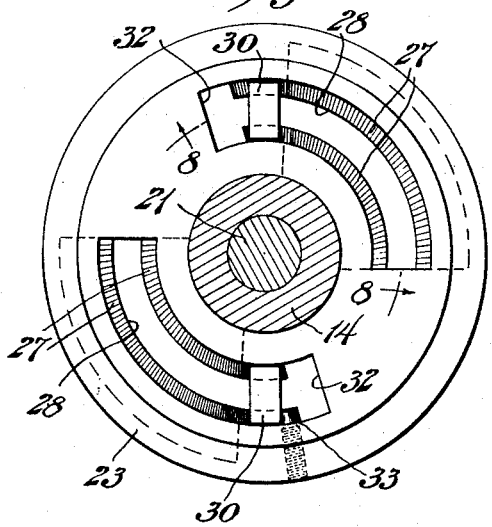
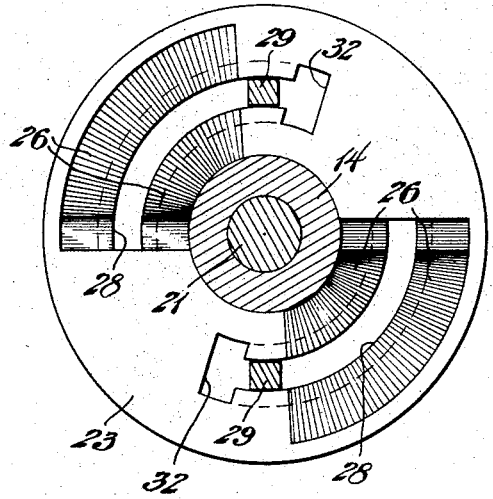
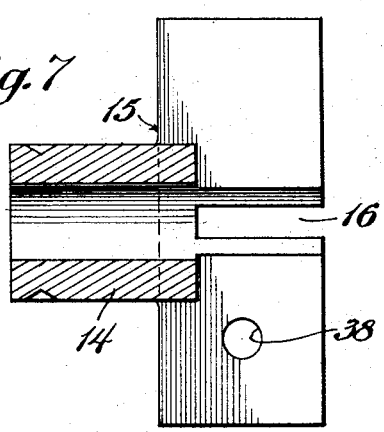
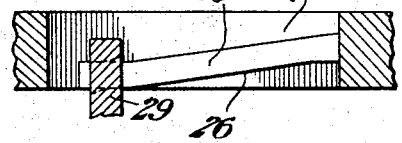
INVENTOR
J. O. Dixon
BY
ATTORNEYS Patented Dec. 12, 1933

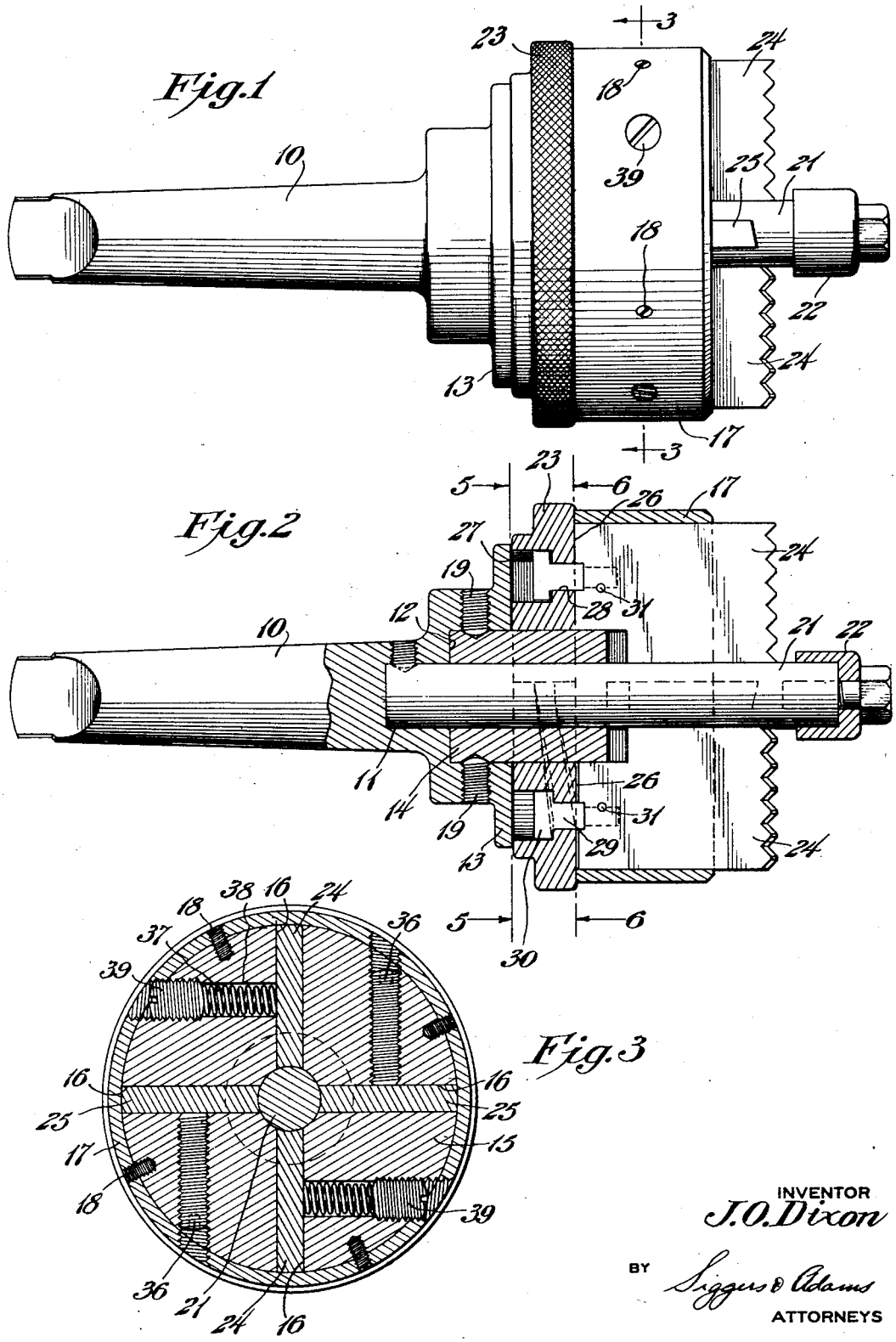

1,939,490

UNITED STATES PATENT OFFICE 1,939,490

COMPOUND TOOL

Joseph O. Dixon, Hanover, Pa., assignor to Mummert-Dixon Co., Hanover, Pa., a corporation of Pennsylvania Application June 30, 1930. Serial No. 464,910

7 Claims. (Cl. 77—58)

This invention relates to compound rotary tools and, among other objects, aims to provide a novel head or holder carrying tools of different characteristics or types adapted to operate successively on the same work and means whereby the tools may be advanced and retracted relative to each other so that they may perform their respective operations independently.

Other aims and advantages of the invention will appear in the specification when considered in connection with the accompanying drawings, wherein:

Fig. 1 is a side elevation of a compound rotary cutting tool embodying the invention;

Fig. 2 is a central sectional view of the tool head shown in Fig. 1;

Fig. 3 is a sectional view taken on the line 3—3 of Fig. 1;

Fig. 4 is a sectional view taken at right angles to the sectional view shown in Fig. 2;

Fig. 5 is a sectional view taken on the line 5—5 of Fig. 2;

Fig. 6 is a sectional view taken on the line 6—6 of Fig. 2;

Fig. 7 is a central sectional view taken through a part of the tool head; and

Fig. 8 is a fragmentary sectional view taken on the line 8—8 of Fig. 5.

Referring particularly to the drawings, the invention is there embodied in a compound, rotary spotting tool, which is used for making machined or smooth faces on bosses or on the surfaces of castings around bolt holes and the like. Heretofore, it has been customary to use what is known as a roughing cutter or cutters to remove the hard, rough scale on the surface of the casting and, after the roughing cut was made, a finishing cutter was used to finish the operation. This was necessary because the hard scale on castings quickly wears and damages the finishing cutters so that they will not do accurate work. These operations have required removal and replacement of the tools employed. Moreover, the machine had to be stopped in order to change tools. The present embodiment of this invention, therefore, provides a compound spotting tool carrying both roughing and finishing cutters which may be advanced and retracted relative to each other while the machine is in operation so that the work can be very quickly and accurately done.

In this example, the tool is carried by a shank 10 of standard size adapted to be inserted in the spindle socket of a drill press or any other machined spindle having provision to receive such a shank. The lower end of the shank is enlarged and presents an axial opening 11 and counterbore 12. An annular flange 13 is preferably formed on the lower end. Within the counterbore 12 is secured the cylindrical extension 14 of a chuck body or head 15 which is shown as having diametrically opposed pairs of radial slots 16 (Fig. 3) for receiving the working tools. The head 15 is here shown as being cylindrical and the slots, which are at right angles to each other, are milled or otherwise cut in the head to a substantial depth. To prevent the segments of the head from springing apart under working stresses, a cylindrical shell 17 is secured to the outer wall thereof conveniently by means of a series of set screws 18.

The cylindrical extension 14 of the head is longer than the depth of the counterbore 12 and its upper end is conveniently secured therein by means of set screws 19 and a key 20 so that the head will rotate with the shank. A pilot stem 21 is also shown as being removably secured to the shank in the opening 11 by means of a set screw. This pilot stem projects through and below the lower end of the head and is adapted to carry a removable cup-shaped pilot 22 of any size or diameter to fit in and be guided by the hole about which the finished surface is to be produced.

A knurled cam ring 23 for adjusting the tools relative to each other, as will be later explained, is here shown as being mounted between the end of the shank flange 13 and the upper face of the head. It is rotatable or oscillatable about the cylindrical projection 14 on the head.

Referring to Figs. 1 to 4 inclusive, a pair of serrated or roughing cutters 24 are inserted in the slots 16 on opposite sides of the pilot stem. Likewise, a pair of finishing cutters 25 are mounted in the other pair of slots 16 and the arrangement is such that said roughing and finishing cutters can be projected or retracted relative to one another. Herein, the roughing cutters are mounted to be reciprocated or adjusted in their slots 16 by means of the cam ring 23. As shown in Figs. 4, 5 and 6, the upper edges of the roughing cutters are secured against the cam-shaped faces 26 on the under side of the cam ring 23. The cam ring also has annular cam grooves 27 cut in its upper face corresponding with the cam-shaped lower faces 26 and arcuate slots 28 (Figs. 5 and 6) are cut through the ring to accommodate the shanks 29 of T-shaped heads 30 carried by the cutters. In this example, the T-shaped heads are made separate from the roughing cutters and secured thereto by means of locking pins 31.

It will be seen that the construction of the cam ring is such that when it is rotated in one direction, the roughing cutters are projected beyond the finishing cutters and, when it is rotated in the opposite direction, the cutters are retracted behind or above the finishing cutters. Furthermore, the cams are so designed that the ring may be grasped on its knurled surface by the operator to hold it still or arrest its rotary movement while the tool is rotating and thereby automatically retract the roughing cutters incident to rotation of the tool through approximately 90°.

To enable the roughing cutters to be removed from the head without dismantling it, the high ends of the cam faces are provided with enlarged transverse slots 32 to permit the T-shaped heads to be slipped through them (Figs. 5 and 6). Further, to prevent the roughing cutters from being disengaged from their cams, a stop pin 33 in the form of a set screw projects into the path of one of the T-shaped heads adjacent to the cross slot 32. This stop pin is effective to prevent the cam ring from being turned too far with respect to the roughing cutters on the opposite side, also. Thus, the roughing cutters can be removed only after the pin 33 has been unscrewed sufficiently to remove its inner end from the path of the T-shaped head. Then, the cam ring may be turned until the transverse slots register with the T-shaped heads.

Referring to the finishing cutters 25, they are shown as being fixedly secured in their respective slots as they are not mounted to slide longitudinally in the slots. Herein, spacer blocks 34 are inserted between the upper edges of the finishing cutters and the upper ends of their slots. The idea is to utilize these blocks until the roughing cutters have been worn or ground away and shortened by a length approximately equal to the thickness of the spacer blocks. The spacer blocks are removed by removing the head and driving them out with a pin through opennigs 35 in the upper end of the head. The finishing cutters may then be seated in the upper ends of their slots. Hence, the roughing cutters may be advanced beyond and retracted behind the cutting edges of the finishing cutters after the roughing cutters are subjected to considerable wear, thus increasing the life of the tool. While the finishing cutters may be secured in their slots by any suitable means, they are here shown as being secured by set screws 36 in screw threaded openings extending through the head and its shell (Fig. 3).

The roughing cutters are conveniently prevented from chattering by means of compression coil springs 37 pressing against their forward faces and arranged in bores 38 (Fig. 3). The compression of the springs against the faces may be adjusted by means of screw abutments 39 in the head.

To operate the combination tool after the cutters are inserted, the shank is secured to the spindle of the machine and the pilot 22 is guided into the opening about which the smooth face is to be made. The cam ring is first turned to the right, looking down on it, to project the roughing cutters beyond the cutting edges of the finishing cutters. The roughing cutters are then fed into the work until the hard crust is removed, leaving a series of small, annular, V-shaped ridges. The serrated cutting edges are conveniently so arranged that a tooth on one side of the pilot stem will cut through the center or a ridge left between the teeth on the other side of the pilot stem. In other words, the paths of the teeth are staggered. The next operation involves the simple expedient of grasping the knurled cam ring and holding it stationary while the tool is still rotating. The roughing cutters are thus automatically retracted without stopping the machine and the cutting edges of the finishing cutters are, in effect, projected to perform their work. The operator then continues to feed the tool into the work until the job is complete. The work is thus done in a fraction of the time required to change tools and to do it according to the old and well known methods.

From the foregoing description, it will be seen that the tool is relatively simple; that it can be assembled and dismantled by an ordinary mechanic; that there are no delicate parts that are apt to require quick replacement; and that it is eminently adapted to perform successive operations on the same work without any loss of time by the machinist and without having to stop the machine.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A spotting tool comprising, in combination, a head presenting radial tool receiving slots in its lower end; a cylindrical extension on the upper end of the head; a shank secured to the cylindrical extension; a pilot stem projecting through the head and secured to said shank; pairs of roughing and finishing cutters mounted in said slots, said finishing cutters being fixedly secured to the head and said roughing cutters being slidably adjustable in their slots; a cam ring rotatably mounted on the cylindrical extension of said head between the head and the lower end of the shank and presenting lower cam faces providing abutments for the upper ends of said roughing cutters; said cam ring also having circumferential slots and grooves; and T-shaped heads on said roughing cutters working in said slots and grooves and arranged to advance and retract said roughing cutters so that the cutters may perform their operation independently of the finishing cutters.

2. A spotting tool comprising, in combination, a head having radial slots therein; a shank removably secured to the head; a pilot stem projecting through the head and removably secured to the shank; a pair of roughing cutters slidably mounted in the head; a cam ring presenting surfaces on its lower face co-operating with the upper ends of said roughing cutters; said cam ring having arcuate slots and cam grooves providing upper cam surfaces; T-shaped heads secured to the upper ends of said roughing cutters and working in said slots and grooves, the arrangement of said cam surfaces being such that when the cam ring is grasped and arrested in its rotation with the tool, the roughing cutters will be retracted; and a pair of finishing cutters fixedly secured in said head arranged to perform the finishing operation when the roughing cutters are retracted.

3. A spotting tool of the character described comprising, in combination, a head; a shank carrying said head; a pilot stem secured in the shank and projecting through the head; a pair of cutters of one type fixedly secured to the head and projecting from the lower end thereof on opposite sides of the shank; a pair of cutters of another type slidably and adjustably secured in said head; a cam ring rotatably mounted with respect to the head and having arcuate cam surfaces; and means directly engageable with said cam surfaces and integrally connected to said adjustable cutters and arranged to effect adjustments thereof upon returning the ring a small part of a revolution with respect to the head so that the pairs of cutters may be advanced and retracted relative to each other to perform their respective cutting operations independently.

4. A spotting tool comprising, in combination, a head; a pair of roughing cutters slidably and adjustably mounted in said head; a cam ring presenting cam faces and grooves co-operating with said roughing cutters and having arcuate slots therein; T-shaped heads on the roughing cutters mounted in said slots and so arranged that when the cam ring is rotated with respect to the head, the roughing cutters will be adjusted; removable stop means arranged in the path of one of said T-shaped heads; said cam ring having transverse slots permitting removal of said T-shaped heads when the stop means is removed; and a pair of finishing cutters fixedly secured in said head and arranged to project beyond the cutting edges of the roughing cutters when the roughing cutters are retracted.

5. A spotting tool comprising, in combination, a tapered shank having a bore and a counterbore; a radially slotted head having a cylindrical extension, the end of which is secured within the counterbore; cutting blades held in the slots; a cam ring having spiral T-shaped grooves rotatably mounted on said head extension and abutted between the end of the shank and the head; and extensions secured to one pair of blades and engageable by the cam ring to advance or retract the blades with rotation of the cam ring relative to the head.

6. A spotting tool comprising, in combination, a shank; a head; a pilot stem; a pair of cutting blocks secured in the head; a pair of blades advanceable and retractable in the head; a rotary cam ring abutted between the shank and the head having a pair of spiral grooves in its inner portion and arcuate slots in one face leading into said grooves; and extensions secured to said movable blades and engaged by said cam grooves.

7. A spotting tool comprising, in combination, a shank; a slotted head removably secured to the shank; a pair of cutters fixed in the head; a second pair of cutters reciprocable in the slots; an annular rotary cam ring abutted between the shank and the head having cam grooves; and means engageable by said grooves and forming rigid extensions of the reciprocable cutters and adapted to advance or retract the same past the cutting edges of the first pair of cutters incident to a quarter revolution of the cam.

JOSEPH O. DIXON.